United States Patent [19]

Chase et al.

[11] Patent Number: 4,593,349

[45] Date of Patent: Jun. 3, 1986

[54] POWER SEQUENCER

[75] Inventors: Mark T. Chase, Glendale; Michael C. Middleton, Phoenix, both of Ariz.

[73] Assignee: Honeywell Information Systems Inc., Phoenix, Ariz.

[21] Appl. No.: 696,215

[22] Filed: Jan. 28, 1985

Related U.S. Application Data

[63] Continuation of Ser. No. 400,770, Jul. 22, 1982, abandoned.

[51] Int. Cl.[4] .............................................. G06F 15/56
[52] U.S. Cl. ..................................... 364/200; 307/29; 307/39; 340/825.06; 364/492
[58] Field of Search ............... 364/200, 900, 483, 492, 364/707; 361/1, 3, 64; 340/825.06; 307/29, 38, 39, 41

[56] References Cited

U.S. PATENT DOCUMENTS 4,312,035  1/1982  Greene .............................. 364/200

Primary Examiner—James D. Thomas
Assistant Examiner—David L. Clark
Attorney, Agent, or Firm—A. A. Sapelli; J. S. Solakian; A. Medved

[57] ABSTRACT

A peripheral power control sequencer incorporates a microcomputer to control the sequencing of the powering of a plurality of peripheral control units. The terminals of the input/output ports of the microcomputer are time-shared to accommodate the several input and output signals needed to accomplish the sequential powering of the peripheral controller.

4 Claims, 8 Drawing Figures

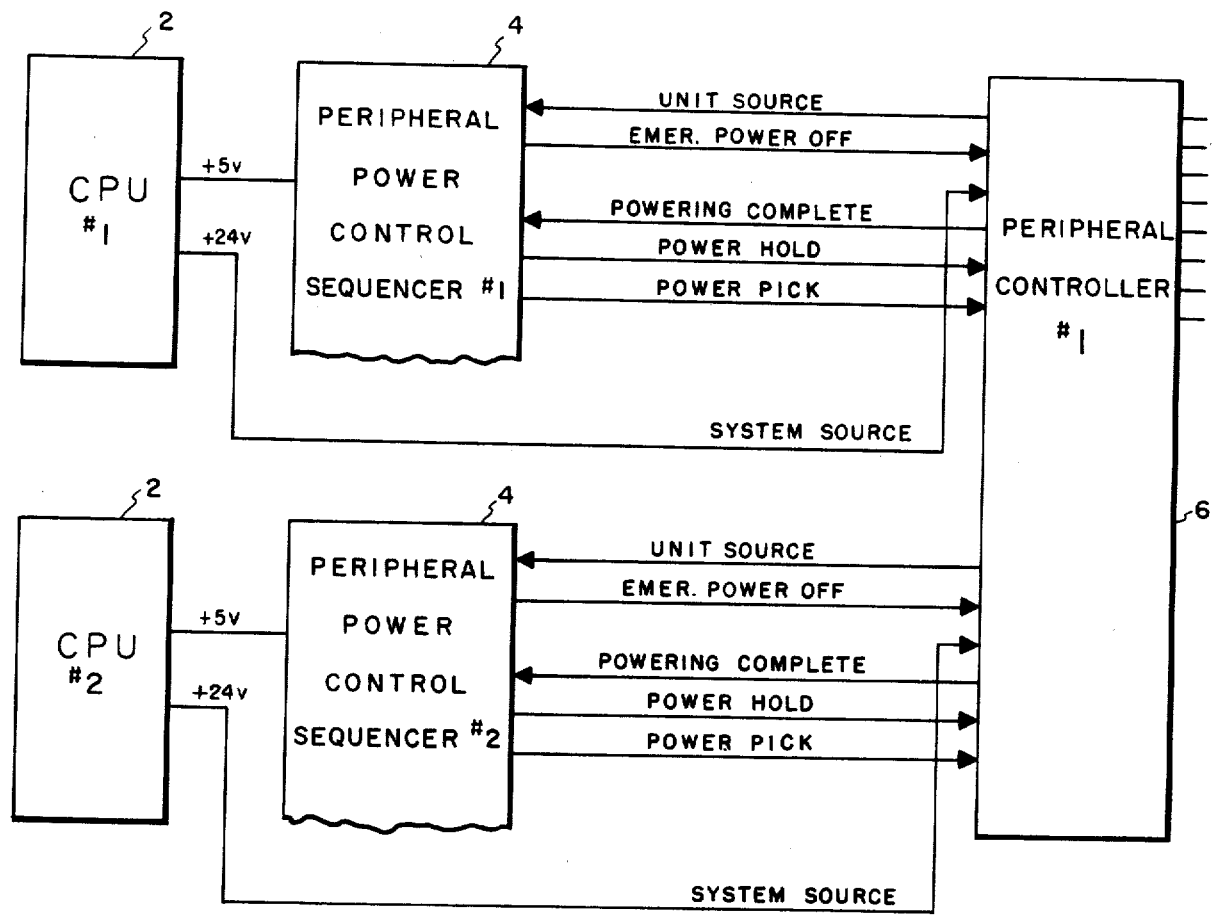
F I G. 2

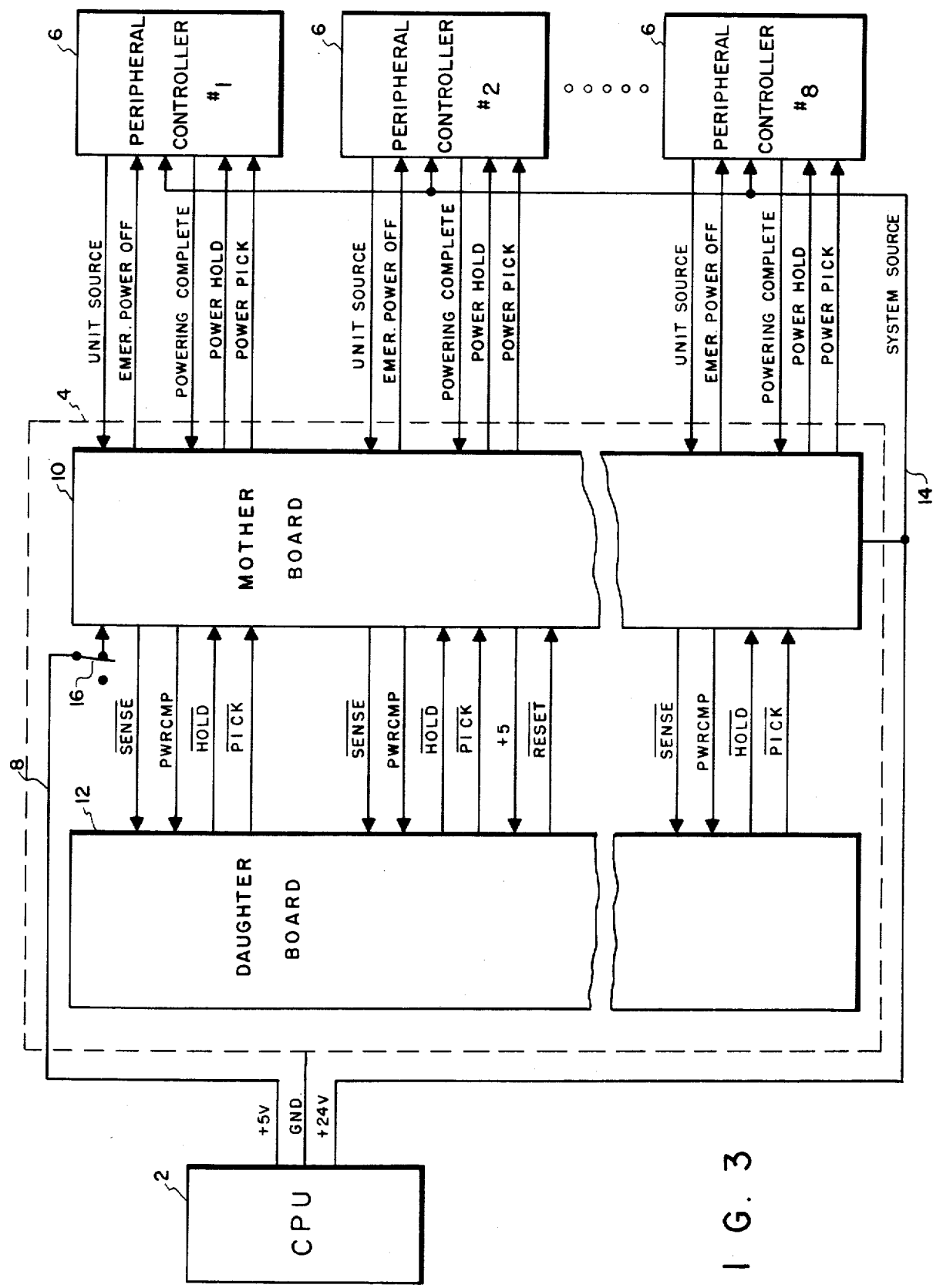
F I G. 3

POWER SEQUENCER

This is a continuation of co-pending application Ser. No. 400,770 filed on 7/22/82, now abandoned.

BACKGROUND OF THE INVENTION

The present invention relates to computer systems. More particularly, it relates to a power sequencing interface for peripheral units.

In computer systems, the principal part of the system is, of course, the central processor unit (CPU) wherein data is manipulated in accordance with programmed instructions. Such systems, however, also include a number of peripheral devices such as tape drive units, printers, and the like. Such peripherals are designed to be operated in conjunction with the central processor unit and, accordingly, must be controlled thereby. One feature of such a control is the initial power up sequence for energizing the peripheral units. In such systems, it is usual that a number of peripheral devices are controlled by a single unit identified as a peripheral controller. The peripheral controller is in turn controlled by the central processor unit. Again in such a system it is not unusual to have a number of such peripheral controllers each controlling a plurality of peripheral units. In an effort to standardize the interfacing between computers and the peripheral units, the United States Department of Commerce through its National Bureau of Standards has issued functional standards for the control units. In accordance with those standards each of the control units sequentially energizes the peripheral devices controlled thereby. In order to minimize power surges in the power supply system relating to the computer, the peripheral control units are energized sequentially.

Again, in an effort to standardize the functional relationship between the controlling computer and the peripheral controllers, the National Bureau of Standards has issued a further standard publication identified as Federal Information Processing Standards, Publication No. 61 (FIPS). That publication defines the standards against which the peripheral controlled sequencing interface structure is designed. Heretofore, the sequencing of the powering of the peripheral controllers through the power sequencer interface unit has been accomplished by such means as stepping switches and power relays. Each of these types of units requires considerable power consumption and space and provides a noisy environment.

SUMMARY OF THE INVENTION

It is, accordingly, an object of the present invention to provide an improved power sequencing interface unit which avoids the shortcomings of the foregoing structure.

It is another object of the present invention to provide an improved power sequencing interface unit as set forth which is compact, quiet, and consumes relatively low power.

It is a further object of the present invention to provide an improved power sequencing interface unit as set forth which features enhanced versatility and flexibility.

In accomplishing these and other objects there has been provided, in acordance with the present invention, a peripheral power control sequencer which satisfies the requirements of FIPS-61 and incorporates a microcomputer to control the sequencing of the powering of a plurality of peripheral controllers. The terminals of the input/output ports of the microcomputer are time-shared to accommodate the sequential input and output signals needed to accomplish the sequential powering of the peripheral controllers.

BRIEF DESCRIPTION OF THE DRAWINGS

A better understanding of the present invention may be had from the following detailed description when read in the light of the accommpanying drawings, in which:

FIG. 2 is a block diagram of a somewhat different system but is still embodying the present invention;

FIG. 3 is a block diagram of system embodying the present invention and showing somewhat greater detail of the structure incorporated therein;

DETAILED DESCRIPTION

Figure 1:
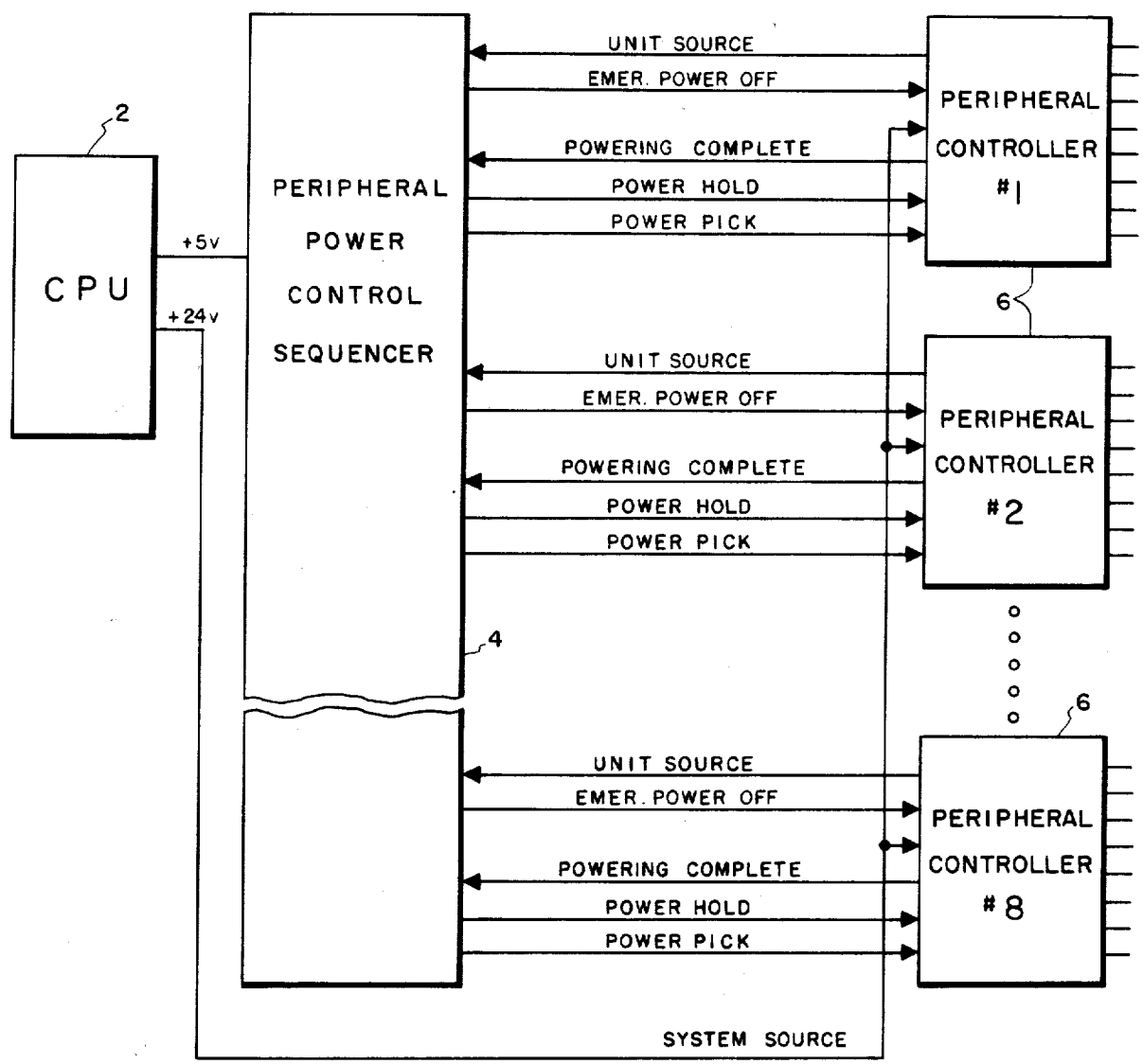
FIG. 1 is a block diagram of a computer system embodying the present invention.

Referring now to the drawings in more detail, there is shown in FIG. 1, in block diagram form, a computer system which embodies the present invention. As shown in FIG. 1, the computer system includes a central processor unit 2 (CPU) connected first to a peripheral power control sequencer 4. Under the control of the CPU 2, a +5V power supply lead connects to the power control sequencer to energize the sequencer. Also connected from the CPU 2 is a +24V power supply line which is connected directly to each of a plurality of peripheral controllers 6. The 24V line from the computer, when activated, supplies power to the several peripheral controllers 6. When, under the control of the CPU 2, the 24V power supply line is connected to the peripheral controllers, and the 5V power supply line is connected to the peripheral power control sequencer 4, the 24V supply to the first peripheral controller results in a signal being transmitted back to the sequencer identified as UNIT SOURCE. The sequencer 4 detects that unit source and returns a signal to the peripheral controller #1 by a line identified as EMERGENCY POWER OFF. The UNIT SOURCE signal applied back to the peripheral power control sequencer 4 from the peripheral controller #1 is indicative that a peripheral controller is, indeed, connected to that first terminal of the sequencer 4. Upon such recognition, the 5V supply initiates a first power command signal identified as a POWER PICK signal from the sequencer 4 and transmits it to the controller #1. The POWER PICK signal transmitted to the peripheral controller #1, in turn, initiates the powering up of the peripheral controller #1 and the peripheral units controlled thereby. When such power up routine has been accomplished, the peripheral controller returns a signal identified as POWERING COMPLETE to the sequencer 4. Upon receipt of the POWERING COMPLETE signal, the sequencer first generates a second power command or POWER HOLD signal which latches the power signal to the peripheral controller #1, it removes the POWER PICK signal from the peripheral controller #1 and then steps to the next set of terminals. If a UNIT SOURCE signal is received indicative that a peripheral controller is connected to the second set of terminals, the sequencer will transmit a POWER PICK signal to the second peripheral controller. Then when the powering up has been completed in the second peripheral controller, there will again be a POWERING COMPLETE signal transmitted from the peripheral controller #2 to the sequencer. Thereupon, the POWER HOLD signal for the second peripheral controller will be issued, the POWER PICK signal will be removed and the sequencer will step to the next set of terminals. If there is no peripheral controller connected to the next set of terminals, there will be no UNIT SOURCE signal supplied to the sequencer 4. Accordingly, the sequencer will then immediately step to the next subsequent set of terminals to detect the presence of a peripheral controller there. Whenever a peripheral controller is present the powering sequence as set forth above with regard to peripheral controllers #1 and 2 will be repeated. If no peripheral controller is attached to any one of the particular sets of terminals, the sequencer will skip to the next subsequent set of terminals until it finds a set of terminals with a controller connected. When it has reached the last position, indicated in FIG. 1 as peripheral controller #8 and the powering has been completed and the power hold signal generated for the peripheral controller #8, the sequencer will stop sequencing and the system is considered as powered up ready for operation by the CPU.

On some occasions, it is desirable to have more than one CPU control the operation of a single peripheral controller. In such circumstances, it is also necessary that the powering up of the peripheral controller or controllers be accomplished by either of the controlling CPUs. To that end there is illustrated in FIG. 2 a system wherein a first CPU 2 controls a first peripheral controller 6 through a first peripheral power control sequencer 4. The same peripheral controller 6 is controlled also by a second CPU 2 through a second peripheral power control sequencer 4. Basically, in the peripheral controller 6, the interconnection leads between the peripheral controller 6 and either of the peripheral power control sequencers 4 are connected in parallel. Thus the peripheral controller 6 will be, effectively, powered up by the first of the CPUs to exercise control. The peripheral controller will remain powered up until the last of the CPUs to release the peripheral controller has powered down. While, in FIG. 2, there has been illustrated only a single peripheral controller 6 which is shared by the first and second CPUs 2, it will be appreciated that there may be other peripheral controllers controlled either individually or in parallel by the two peripheral power control sequencers 4.

In FIG. 3 there is illustrated a system as shown in FIG. 1 with somewhat greater detail of the peripheral power control sequencer 4. Here, as before, the CPU 2 is connected, through a +5V power supply lead 8, to the peripheral power control sequencer 4. The peripheral power control sequencer 4 is connected through the appropriate leads to a plurality of peripheral controllers 6. In FIG. 3, however, it may be seen that in the exemplary embodiment of the present invention, the peripheral power control sequencer 4 includes a mother board 10 and a daughter board 12. Again, the CPU 2 is connected to each of the several peripheral controllers by a 24V supply lead 14 designated SYSTEM SOURCE. The interconnecting leads, specifically UNIT SOURCE, EMERGENCY POWER OFF, POWERING COMPLETE, POWER HOLD, and POWER PICK, connected between the peripheral controllers 6 and the peripheral power control sequencer 4 are, in fact connected between each of the peripheral controllers 6 and the mother board 10 of the peripheral power control sequencer 4.

In actual practice, the mother board is a primary circuit board with the daughter board mounted on and coupled thereto by a suitable edge connector. The connector between the mother board and the daughter board carries an identical set of four each interconnecting leads for each of the available peripheral controller outputs on the mother board. These interconnect leads are $\overline{\text{SENSE}}$, PWRCMP, $\overline{\text{HOLD}}$ and $\overline{\text{PICK}}$.

There are two additional leads between the mother board and the daughter board. These are a 5V power supply lead and a $\overline{\text{RESET}}$ lead. These will all be discussed in more detail in connection with the discussion of FIG. 4, 5 and 6. In the sequencer 4, there is provided a switch 16 in the 5V supply line 8.

In the aforementioned standards, the requirement for the operational relationship of the EMERGENCY POWER OFF lead is optional. In accordance with that option, whenever the signal is removed from the EMERGENCY POWER OFF lead, the peripheral controller associated therewith will be powered down. There is no requirement that the powering down of the several peripheral controllers be accomplished in any sequence. Accordingly, in the preferred embodiment of the present invention, the EMERGENCY POWER OFF signal is applied merely as a return path for the UNIT SOURCE lead. Emergency power off operation is accomplished by operation of the switch 16. Toggling switch 16 to the open contact thereof, removes the +5V supply from the entire sequencer 4. With the power removed from the sequencer 4 the POWER HOLD signal for each of the peripheral controllers is immediately removed, thereby powering down the peripheral controllers 6.

Figure 4:
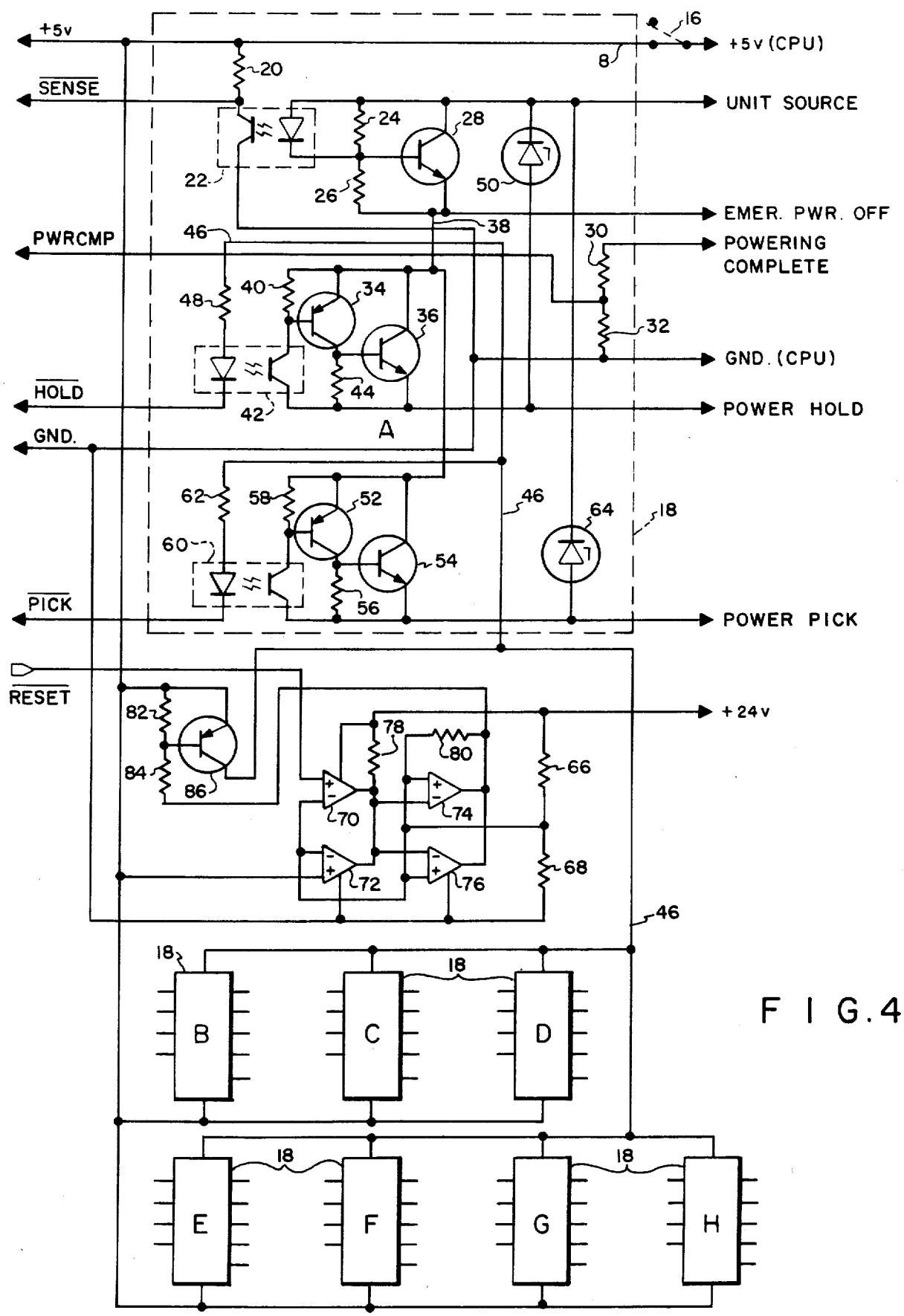
FIG. 4 is a schematic diagram showing details of one of the component parts of the structure illustrated in FIG. 3.
Figure 5A:
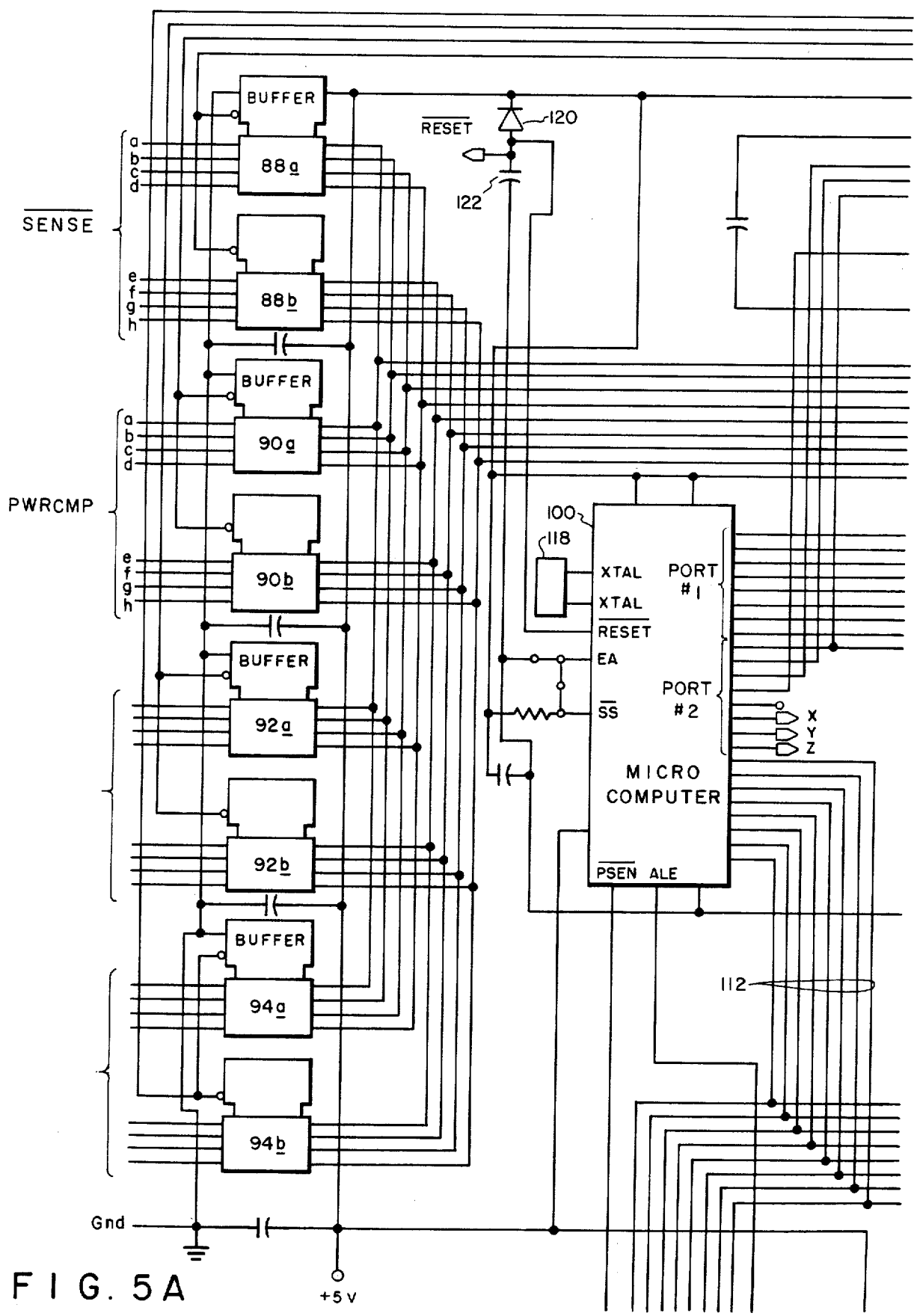
FIGS. 5A–5C comprise a logic block diagram of the component structure of another portion of the system illustrated in FIG. 3.
Figure 5B:
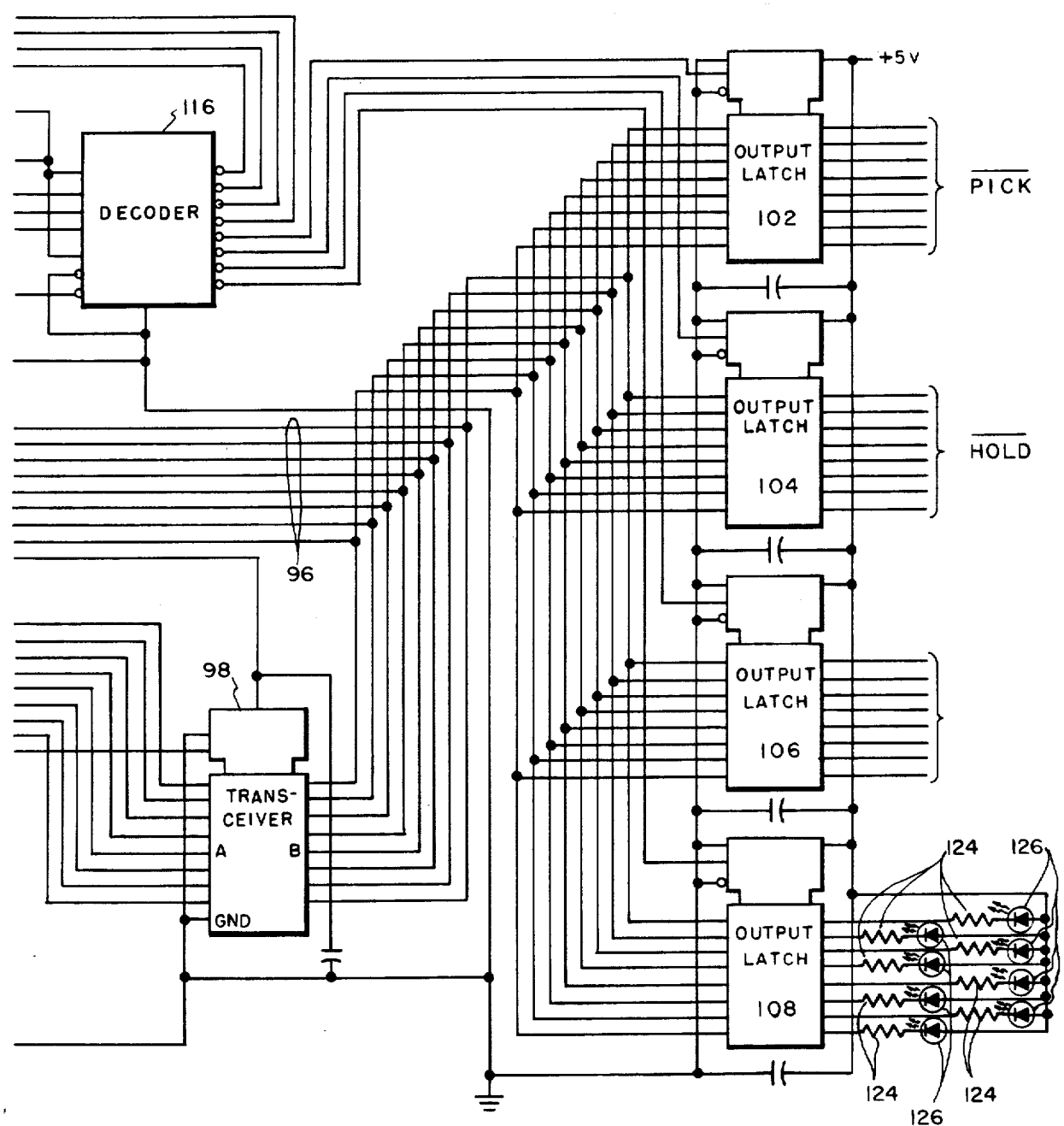
Figure 5C:
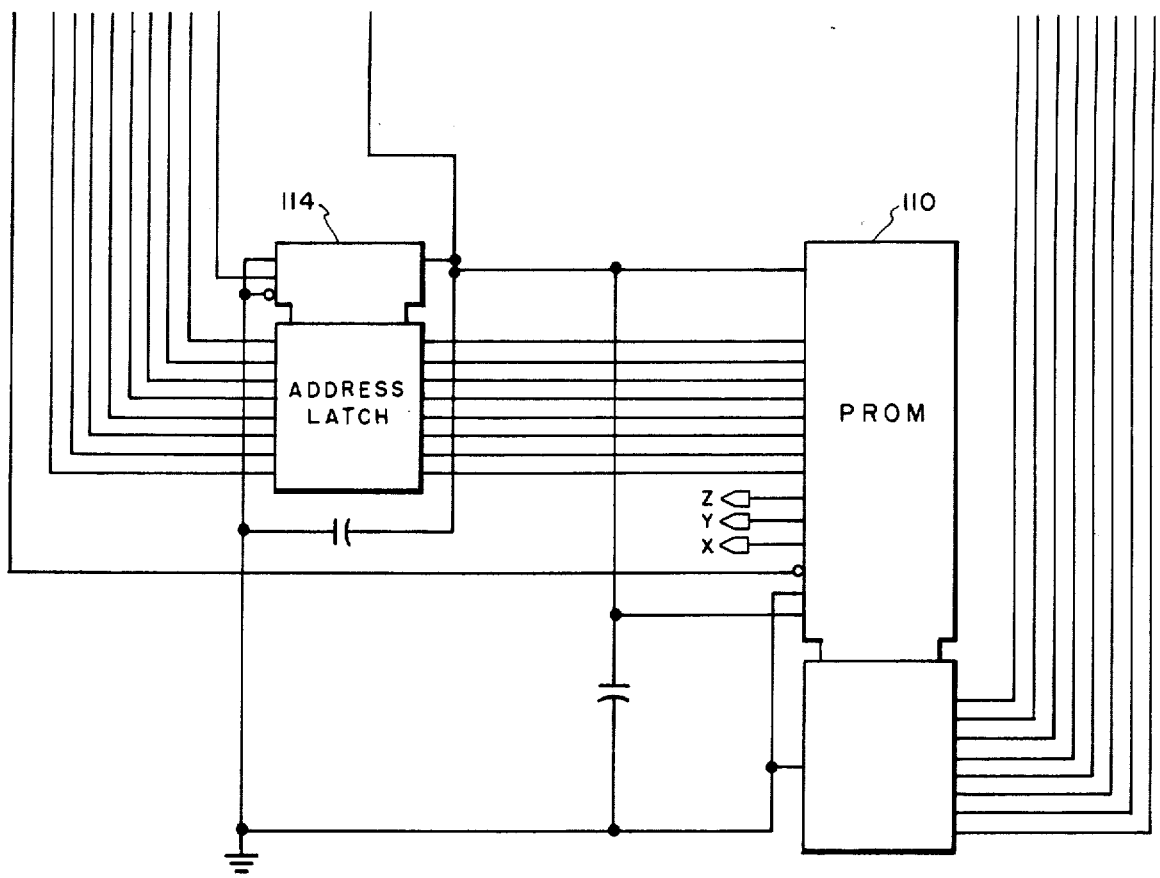
Figure 6:
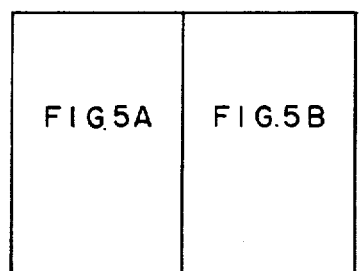
FIG. 6 shows the relationship of FIGS. 5A–5C.

A better understanding of these features will be had from a discussion of FIGS. 4, and 5. FIG. 4, in particular, is a schematic diagram of the mother board 10. In the exemplary embodiment of the present invention, the peripheral power control sequencer has accommodation for controlling the powering up of up to eight peripheral controllers. In accomplishing this, there are provided eight distinct control segments. In FIG. 4, one such segment is illustrated in detail while the remaining seven segments are illustrated in block diagram form, all such segments being identical in structure. Control segment 18A includes the 5V power supply lines from the CPU 2 with its switch 16. The 5 volt supply line 8 is connected through a resistor 20 to the collector of a light sensitive transistor forming a part of an optical isolator 22. The emitter of the light sensitive transistor is connected to a ground return for the CPU generated power supply signals. The UNIT SOURCE signal line from the peripheral controller is connected to the anode of a light emitting diode forming a part of the optical isolator 22. The UNIT SOURCE line is also connected to one end of a series connected pair of resistors 24 and 26. The opposite end of the resistor 26 being connected to the EMERGENCY POWER OFF return line to the peripheral controller 6. The cathode of the light emitting diode in the isolator 22 is connected to the junction between the resistors 24 and 26 and to the base electrode of a transistor 28. The collector of the transistor 28 is connected to the UNIT SOURCE line while the emitter of the transistor 28 is connected to the EMER- GENCY POWER OFF line. The junction between the resistor 20 and the collector of the light sensitive transistor in the optical isolator 22 is connected as the $\overline{\text{SENSE}}$ line connection to the daughter board.

The POWERING COMPLETE signal from the peripheral controller 6 is connected through a voltage dividing pair of resistors 30 and 32 and then to the CPU ground. The junction between the resistors 30 and 32 is connected to the line designated PWRCMP to the daughter board.

A POWER HOLD control circuit includes a first transistor 34 and a second transistor 36. An interconnect lead 38 is connected to the EMERGENCY POWER OFF lead at the emitter of transistor 28. That lead supply of energizing current for the transistors 34 and 36, is connected to the emitter of the first transistor 34 and to the collector of the second transistor 36. A resistor 40 is connected between the emitter of the transistor 34 and the base thereof. Also connected to the junction between the base of the transistor 34 and the resistor 40 is the collector of a light sensitive transistor forming a part of an optical isolator 42. The emitter of the transistor in the isolator 42 is connected to the POWER HOLD lead. The collector of the transistor 34 is connected first to the base electrode of the second transistor 36 and through a resistor 44 to the POWER HOLD lead. The emitter of the transistor 36 is connected directly to the POWER HOLD lead. An internal controlled power source lead 46, which will be discussed in more detail hereinafter, is connected through a resistor 48 to the anode of a light emitting diode in the optical isolator 42. The cathode of the light emitting diode is connected to the $\overline{\text{HOLD}}$ lead which is, in turn connected to the daughter board. A zener diode 50 is connected between the power hold lead and the unit source lead as a voltage overload protection.

A substantially identical circuit to that provided for the POWER HOLD signal is also provided for the POWER PICK signal. Specifically, the interconnect lead 38 from the EMERGENCY POWER OFF lead is connected to the emitter of a first transistor 52 and the collector of a second transistor 54. The collector of the first transistor 52 is connected through a resistor 56 to the POWER PICK signal line. The junction between the collector of the transistor 52 and the resistor 56 is connected to the base electrode of the second transistor 54, the emitter of which is connected directly to the POWER PICK signal line. The interconnect lead 38 is also connected through a resistor 58 to the collector of a light sensitive transistor in an optical isolator 60. The emitter of the light sensitive transistor in the optical isolator 60 is connected directly to the POWER PICK signal line. The junction between the resistor 58 and the collector of the light sensitive transistor is connected to the base electrode of the first transistor 52. Here, too, the internal controlled power source lead 46 is connected through a resistor 62 and the light emitting diode in the optical isolator 60 to the $\overline{\text{PICK}}$ signal lead which is, in turn, connected to the daughter board. Again, a zener diode 64 is connected between the POWER PICK signal line and the UNIT SOURCE line to protect against overvoltages.

The control segments 18 identified wih the letters B, C, D, E, F, G and H are identical to the A control segment 18 thus far described.

Previous mention was made of the internally controlled power source lead 46. To accomplish the control of the signal on that lead, a 24 V, in the exemplary embodiment, power supply is connected across a pair of resistors 66 and 68, comprising a voltage divider. The junction between the two resistors 66 and 68 is connected to the inverting input terminals of each of a pair of comparators 70 and 72. The 5 V supply line connected to the lead 8 is connected to the noninverting input of the comparator 72. The noninverting input of the comparator 70 is connected to an input lead labeled $\overline{\text{RESET}}$ which is derived from the daughter board as will be more fully set forth hereinafter. The output of each of the two comparators 70 and 72 are connected together and to the inverting input of each of a pair of parallel connected comparators 74 and 76, respectively. The output of the comparators 70 and 72 are also connected, through a pull-up resistor 78, to the 24 V power supply line. The noninverting input terminal of each of the two comparators 74 and 76 are connected to the junction between the resistors 66 and 68. A feedback resistor 80 connects the output of the two parallel comparators 74 and 76 to the noninverting input terminals thereof. A pair of voltage dividing resistors 82 and 84 are serially connected between the +5 V power supply line 8 and the output terminals of the two parallel connected comparators 74 and 76. The junction between the resistors 82 and 84 is connected to the base electrode of a transistor 86. The emitter of the transistor 86 is connected to the 5 V power supply line lead 8 while the collector of the transistor 86 is connected to the controlled power supply source lead 46.

The operation of the circuit elements will be discussed following the description of the organization of the accompanying daughter board.

In FIG. 5 there is shown a logic diagram of the daughter board as implemented in the exemplary embodiment of the present invention. The $\overline{\text{SENSE}}$ signals from each of the control segments of the motor board are connected to individual input terminals of a first input buffer 88. In the exemplary embodiment, the input buffer 88 is illustrated as two four terminal buffers designated 88A and 88B. These comprise an eight terminal buffer to accommodate the $\overline{\text{SENSE}}$ signals from the eight control segments of the mother board. A similar input buffer 90, including the two buffer elements 90a and 90b are provided to accommodate the eight input signals designated PWRCMP from the mother board. Two additional buffer elements 92 and 94 are illustrated but are unused in the practice of the present invention. The output terminals of the several buffers are connected to the corresponding leads, in parallel, of an internal interconnect bus 96. The individual leads of the bus 96 are connected first to the corresponding B terminals of a transceiver 98. The A terminals of the transceiver 98 are connected to the input/output terminals of a first port in a microcomputer 100. The interconnect bus 96 is also connected to the corresponding input terminals, in parallel, of a plurality of output latch assemblies 102, 104, 106 and 108, respectively.

The microcomputer 100 is operated in accordance with instructions stored in a PROM 110. The instruction output from the PROM 110 is connected to the microcomputer 100 by way of an address instruction bus 112. The same bus 112 connects the microcomputer 100 to the input of an address latch 114. The address latch is operable to receive address information from the microcomputer and latch that address information for subsequent transmission to the PROM 110 to effect the selection of the required instruction. The address latch 114 is selectively enabled by the microcomputer by way of the ALE, or Address Latch Enable, signal. Similarly, the PROM is enabled by the $\overline{\text{PSEN}}$, or Program Select Enable, signal. The time-sharing of the terminals of the microcomputer is similar to that shown in a copending application of Hernandez and Middleton, Ser. No. 355,817.

The fourth terminal of the second port of the microcomputer 100 is connected to the enable inut of a decoder 116. The first three terminals of the second port of the microcomputer 100 carry the signal code to the decoder 116. The three-bit code at the input of the decoder 116 enables the decoder to select-one-out-of-eight output terminals for energization in accordance with the selected input code. The first four output leads from the decoder 116 are connected respectively to selectively enable the four input buffers 88, 90, 92 and 94. The last four output terminals of the decoder 116 are connected, respectively, to selectively enable the four output latches 102, 104, 106 and 108. The first output terminal of the second port of the microcomputer is also connected as an enabling signal for the transceiver 98. An external crystal oscillator 118 is connected to the crystal input terminals of the microcomputer 100 to provide the basic timing clock signals for the system. A $\overline{\text{RESET}}$ output terminal of the microcomputer 100 is connected through a diode 120 to the +5 V supply line. The same $\overline{\text{RESET}}$ terminal is connected through a capacitor 122 to ground. The junction between the diode 120 and the capacitor 122 is connected as the $\overline{\text{RESET}}$ signal to the noninverting input terminal of the comparator 70 on the mother board.

A characteristic of the microcomputer 100 is that during power-up or turn on of the system, the 5 volts is applied to the input of the microcomputer and is reflected as an output signal at the $\overline{\text{RESET}}$ terminal. As the voltage level at the $\overline{\text{RESET}}$ terminal rises through +1 V, the microcomputer sets its output terminals in accordance with the manufacturer's specification. During the interval between the time when the output terminals are set and the microcomputer has been fully powered up to the full 5 volts, there is a potential for spurious and/or erroneous signals being issued from the microcomputer output ports.

That portion of the circuitry shown on the mother board (FIG. 4) involving the comparators 70, 72, 74 and 76 as well as the transistor 86, comprises a so-called start-up circuit which will prevent such spurious signals from being effectively applied to the various $\overline{\text{PICK}}$ and/or $\overline{\text{HOLD}}$ output circuits. The voltage divider comprised of the resistors 66 and 68 produce a voltage of 4.4 volts at the junction thereof. That signal is applied to the inverting input terminals of the comparators 70 and 72. The noninverting input of the comparator 72 is connected directly to the 5 volt supply line while the noninverting input of the comparator 70 is connected to the aforementioned $\overline{\text{RESET}}$ output terminal of the microprocessor.

With the output of the two comparators 70 and 72 connected together and both being connected directly to the inverting input of the parallel connected comparators 74 and 76, the two comparators 70 and 72 are effectively ORed together. Thus if the signal applied to the noninverting input of either of the two comparators 70 or 72 is less than the 4.4 volts applied to the inverting input terminals thereof, the output signal of the ORed pair will be a logical low. That logical low is inverted by the parallel connected comparators 74 and 76 to provide a logical high at the lower end of the voltage divider comprised of resistors 82 and 84. With the logical high at the lower end of that voltage divider, the transistor 86 is nonconductive.

With the transistor 86 held in a nonconductive state, no current can flow through the interconnect lead 46, thence, through the diodes of the optical isolators 42 and 60. With no current through the diodes, no signal can be transmitted to the POWER HOLD or POWER PICK signals of any of the control segments.

In practice, as the voltage level of the signal at the $\overline{\text{RESET}}$ output terminal of the microcomputer 100 begins to rise, it first charges a capacitor 122. The inhibit signal produced is of a duration of about 0.5 seconds. This is a sufficient time for all of the circuitry within the microcomputer to be fully initialized. At the end of that interval the $\overline{\text{RESET}}$ signal will have exceeded 4.4 volts as will the 5 volt signal applied to the noninverting input of the comparator 72. When that occurs, the output of the comparators 70 and 72 will be a logical high. That high will be inverted by the paralled comparators 74 and 76 to apply a logical low at the lower end of the voltage divider 82, 84. Thereupon, the transistor 86 becomes conductive, allowing current to flow through the diodes of the isolators 42 and 60 if the $\overline{\text{PICK}}$ or $\overline{\text{HOLD}}$ line has been enabled by the microcomputer 100.

During the initialization section of the applied program, the output ports of the microcomputer 100 will have been reset to their nonselected states as will all of the output latches. When the CPU 2 supplies a 24 volt signal to the peripheral controllers 6, each of the peripheral controllers on the line will provide a corresponding UNIT SOURCE signal at the designated output terminal. As previously noted, that signal is applied to the peripheral power control sequencer 4. As shown in FIG. 4, that signal is more specifically applied to the UNIT SOURCE signal lead on the mother board. As such, the signal causes the light emitting diode in the isolator 22 to be illuminated. The illumination of that diode causes current to flow through the light sensitive transistor in the isolator 22. The current flowing through that light sensitive transistor causes a signal to be transmitted on the $\overline{\text{SENSE}}$ line to the daughter board. That $\overline{\text{SENSE}}$ signal is connected to the input buffer on the appropriate input line. If, as illustrated in FIG. 4, the sense line represents the signal associated with the A control segment 18, then that signal will be applied to the a input terminal of the buffer 88a.

The microcomputer under the control of instructions from the PROM 110 enables the buffer 88a by way of the selection code through the decoder 116. The enabling or selection of the buffer 88 allows the signal that appears at the a input terminal of the buffer 88 to be delivered to the B side of the transceiver 98. The transceiver 98 under the control of the microcomputer, delivers that signal to the corresponding terminal of the input port 1. The microcomputer 100 recognizes that $\overline{\text{SENSE}}$ signal as indicating that a peripheral controller is connected to the first control segment of the mother board. It, the microcomputer, then transmits a signal on the corresponding line through the transceiver 98 back to the corresponding terminal on the output latch 102. The latch 102 will have been enabled, again, by the microcomputer operating through the decoder 116. The output latch 102 then transmits a $\overline{\text{PICK}}$ signal on the corresponding lead to the $\overline{\text{PICK}}$ input of the A control segment 18 on the mother board. The $\overline{\text{PICK}}$ signal activates the optical isolator 60, causing a POWER PICK signal to be transmitted from the mother board to the first peripheral controller.

The peripheral controller responds to the POWER PICK signal and, in accordance with its own internal program, activates the powering up of the elements controlled by that controller. When such powering up has been completed by the first peripheral controller it returns a signal to the mother board on a line designated POWERING COMPLETE. In practice that signal is a 24 V signal. The 24 V signal is divided by the voltage divider 30, 32, to produce a 5 V signal designated PWRCMP. That latter signal is then transmitted to the daughter board on the first input terminal of the buffer 90. The buffer 90, being enabled by the microcomputer 100 through the operation of the decoder 116, transmits the PWRCMP signal on the bus 96 through the transceiver 98 to the first line of port 1 of the microcomputer.

The microcomputer 100 recognizes that signal as signifying that the powering of the first peripheral controller has been completed. It then issues a $\overline{\text{HOLD}}$ signal on the first line of the port 1 which is transmitted through the transceiver 98 to the first line of the output latch 104. The output latch 104 will have been enabled by the microcomputer 100 by way of the decoder 116. The signal latched on the first output line of the output latch 104 is transmitted to the $\overline{\text{HOLD}}$ signal of the first control segment of the mother board. That $\overline{\text{HOLD}}$ signal activates the optical isolator 42 resulting in a POWER HOLD signal being transmitted from the mother board to the first peripheral controller. The POWER HOLD signal is thus latched up, while the microcomputer deactivates the POWER PACK signal.

The microcomputer then steps to the second input line. The process is repeated with respect to the B control segment 18 illustrated in FIG. 4. When the B segment has been powered up in accordance with the same procedure outlined with respect to the A control segment, the microprocessor then steps to successive units. If, for example, there is no peripheral controller connected to the line represented by the C control segment 18, there will be no UNIT SOURCE signal returned to the peripheral power control sequencer on the third sequence. In the absence of a UNIT SOURCE signal, there will be no $\overline{\text{SENSE}}$ signal returned to the daughter board. The microcomputer 100 will recognize the absence of such a signal and will immediately sequence to the next terminal on the input/output port. If there is a peripheral controller connected to that output port then the powering up sequence will be repeated as with the A segment. If, in fact, there is no peripheral controller connected in that position, the microprocessor will then recognize the absence of that $\overline{\text{SENSE}}$ control signal and immediately step to the next unit.

When all eight of the lines have been serviced in the manner set forth, the microcomputer will then recognize that the entire system under its control has been powered up and will stop sequencing. Those units which have been powered up will be latched on with the $\overline{\text{HOLD}}$ signal latched at the output of the output latch 104 and the entire system thereby controlled will remain in the powered up condition.

Simultaneously with the issuing of the $\overline{\text{HOLD}}$ signal to the output latch 104, a corresponding signal on the same line is applied to the output latch 108. Thus when the microcomputer has recognized that there is a peripheral controller connected to the sensed circuit, it not only issues a $\overline{\text{HOLD}}$ signal at the output of the latch 104 but at the same time issues an output signal from the corresponding line of the output latch 108. The output terminals of the latch 108 are each connected respectively through a current limiting resistor 124 and a light emitting diode 126. It is contemplated that the light emitting diodes 126 will be displayed visibly to the system operator. Thus when the system has been powered up the operator may, at a glance, by determining which of the light emitting diodes 126 have been illuminated, which of the output lines from the latch 104 have peripheral controllers responding thereto.

When it is desired to power down the system, this may be accomplished first by the control of the CPU 2. If the CPU removes the 5 V power supply from the peripheral power control sequencer, the various power control circuits on both the mother board and the daughter board will be powered down. In order to protect the peripheral controllers from spurious control signals during such a powering down process, the inhibit signal circuit involving the comparators 70 and 72 will immediately, as soon as the 5 V power supply line has reduced its voltage to below 4.4 volts, turn off the conduction of the transistor 86 thereby interrupting or blocking the transmission of any POWER HOLD or POWER PICK signals to the peripheral controllers.

On the other hand, the powering down of the peripheral controllers may be accomplished manually by opening the switch 16. Opening that switch again removes the 5V power supply line from the mother and daughter boards and causes the inhibit signal circuit to be operative to block the transmission of any POWER HOLD or POWER PICK signals to the peripheral controllers.

It is to be noted that in the powering down process it is not necessary to sequence the several units. Accordingly with the opening of the switch 16 or the removing of the power by operation of the CPU, all of the peripheral controllers controlled by the CPU or that power supply line are simultaneously powered down.

In accordance with the demands of the system and the Standards, the sequencing of the energization of the several peripheral controllers is accomplished by the microcomputer, following the instructions stored in the PROM 110. If, for any reason, the system demand should be changed, the necessary changes may be accomplished by switching to a different PROM with a modifid set of instructions or by reprogramming the instructions in the existing PROM. Thus, a high degree of flexibility and versatility is established.

Thus there has been provided, in accordance with the present invention, a peripheral power control sequencer which satisfies the standards set forth by the National Bureau of Standards, which avoids the necessity of using stepping switches or relays to effect the sequencing, which is relatively small, quiet and consumes little power to effect the sequencing.

The embodiments of the invention in which an exclusive property or privilege is claimed are defined as follows.

We claim:

1. In a computer system, having a central processor unit, a power control sequencer, for sequentially controlling the application of power to a plurality of control units, each control unit controlling a power-up of elements connected to each respective control unit, wherein said central processor unit is connected to each of said control units to supply a first power signal to each of said control units, said power control sequencer comprising:

(a) first sensing means, connected to each of said control units, for detecting a unit source signal from each of said control units to generate a plurality of sense signals, each sense signal corresponding to a respective unit source signal, said unit source signal indicating that the respective control unit is connected in the computer system and has received the first power signal;

(b) first logic means, having a plurality of first input terminals to receive a respective sense signal, and having a plurality of first output terminals to transmit a plurality of pick signals, each pick signal corresponding to a respective sense signal received by said first logic means, for controlling a power application sequence whereby said first inut terminals are sequentially interrogated, and upon detecting the presence of the sense signal at the first input terminal being interrogated, to transmit the respective pick signal to the corresponding first output terminal;

(c) first driver means, having a plurality of second input terminals operatively connected to a respective first output terminal of said first logic means, and having a plurality of second output terminals, each of said second output terminals connected to a respective control unit, for transmitting a power pick signal in response to the corresponding pick signal, each power pick signal corresponding to the respective pick signal, the power pick signal causing the respective control unit to activate a power-up sequence of the elements controlled by the control unit.

2. A power control sequencer, according to claim 1, further comprising:

second sensing means, connected to each of said control units, for detecting a power complete signal from each of said control units to generate a plurality of power on signals, each power on signal corresponding to a respective control unit, said power on signal indicating that the respective control unit power-up sequence of the elements controlled by the control unit is completed.

3. A power sequencer, according to claim 2, further comprising:

(a) second logic means having a plurality of third input terminals to receive a respective power-on signal, and having a plurality of third output terminals to transmit a plurality of hold signals, each hold signal corresponding to a respective power-on signal, for generating a corresponding hold signal in response to detecting the respective power on signal; and (b) second driver means, connected to each of the third output terminals of said second logic means, and further connected to said first driver means, and having a plurality of fourth output terminals, each of said fourth output terminals connected to a respective control unit, for transmitting a power hold signal in response to the respective hold signal, each power hold signal corresponding to the respective hold signal, the power hold signal causing the second driver means to latch the power hold signal and further causing the first driver means to remove the power pick signal to the corresponding control unit, thereby completing the power application sequence.

4. A power sequencer, according to claim 3, wherein said first logic means and said second logic means are controlled by a microprocessor.

* * * * *